United States Patent

[11] 3,570,388

[72] Inventor Robert Gottlieb
 Jackson Heights, N.Y.
[21] Appl. No. 819,261
[22] Filed Apr. 25, 1969
[45] Patented Mar. 16, 1971
[73] Assignee Argo Industries Corporation
 Jackson Heights, N.Y.

[54] POPCORN POPPER
 10 Claims, 5 Drawing Figs.
[52] U.S. Cl. ............................................. 99/238.1
[51] Int. Cl. ............................................. A23l 1/18
[50] Field of Search .................................. 99/238.1,
 237, 238, 238.2, 238.3, 238.5, 238.6, 238.7,
 238.4; 46/226, 14

[56] References Cited
 UNITED STATES PATENTS
 1,436,400  11/1922  Mabey .................... 99/238.4
 1,704,133  3/1929  LeClaire .................. 99/238.4X Primary Examiner—David J. Williamowsky
Assistant Examiner—Philip C. Kannan
Attorney—Eugene E. Geoffrey, Jr.

ABSTRACT: A popcorn popper having an outer housing, a centrally disposed heating device within said housing and means extending upwardly from the heating element with a portion thereof extending through the upper wall of the outer housing whereby corn to be popped may be inserted into the popper without removing the outer housing and at the same time retaining the corn in contact with the heating element until the kernels are actually exploded whereupon the popped corn can be discharged into the container surrounding the heating element, and an additional supply of kernels introduced into the popper. The outer housing includes means for discharging the popped corn therefrom.

Patented March 16, 1971 3,570,388

INVENTOR
ROBERT GOTTLIEB
BY
ATTORNEY

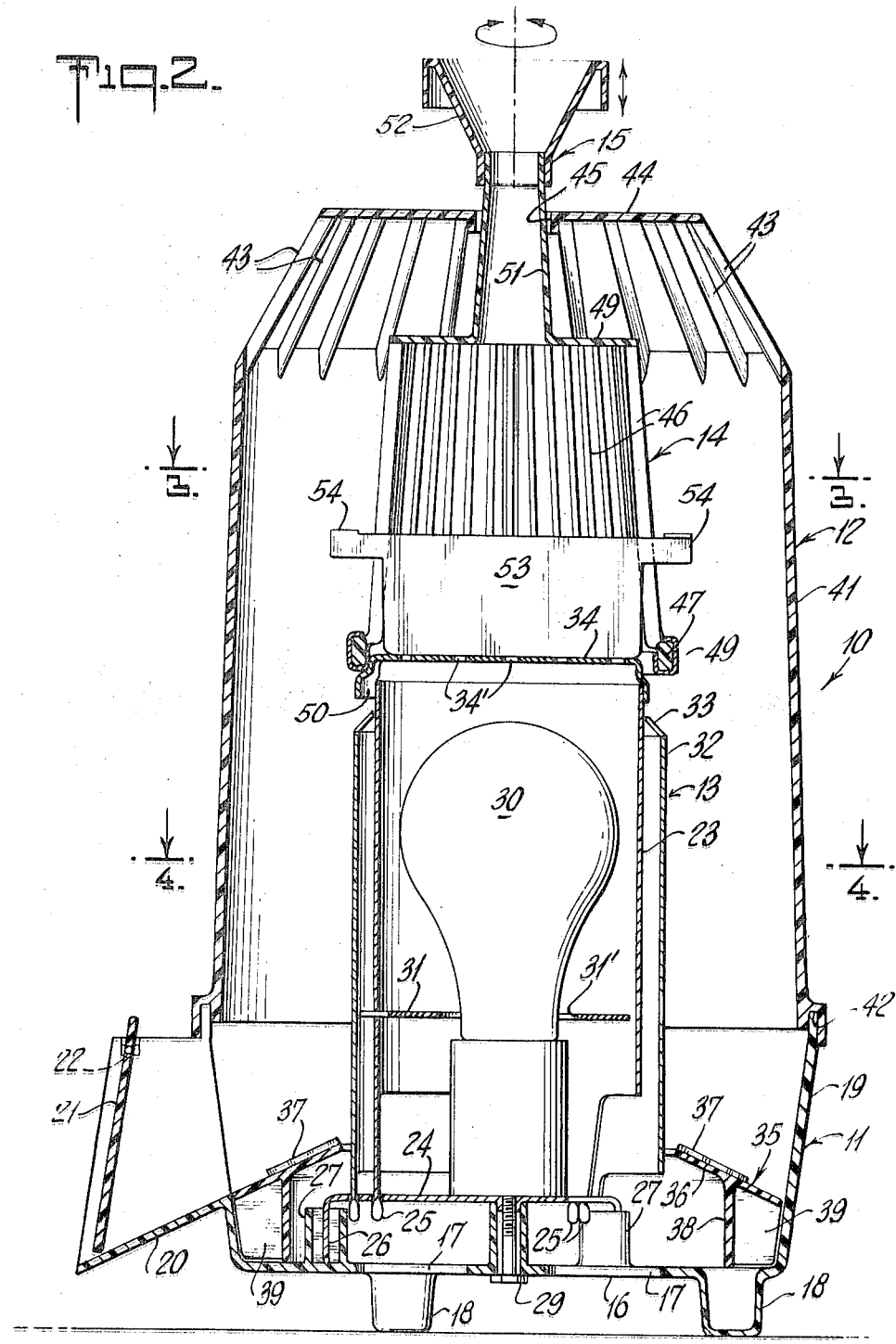

POPCORN POPPER

This invention relates to an electric popcorn popper and more specifically to a novel and improved popper which provides for the admission of corn to be popped and discharge of the popped corn into an area about the heating element to maintain the popper corn in a heated state while additional corn is introduced into the popper to continue the popping process.

Prior known devices for popping corn have included conventional vessels with means for retaining the popped corn within the vessel until all or substantially all of the kernels have been exploded. Such vessels have included in addition to so-called rigid vessels or pots crushed aluminum containers which would automatically expand under the pressure of the exploded kernels as well as the gas pressure therein. In addition, prior known devices have required the utilization of a suitable cooking oil or grease to prevent burning or searing of the kernels during the popping process.

This invention greatly simplifies the popping process and provides means for popping corn which avoids the need for cooking greases or oils and permits successive batches of kernels to be popped while retaining the popped corn in a heated condition until it is dispensed for consumption.

Another object of the invention resides in the provision of a novel and improved popcorn popper that is characterized by its simplicity, ease of operation, and complete safety.

Still another object of the invention resides in the provision of a novel and improved popcorn popper wherein means are provided for introducing batches of kernels into the heating area and retaining the kernels in the heating area until the popping operation has been completed whereupon the popped kernels can be discharged into a receiving area about the heating element and additional kernels immediately fed into the apparatus for continuing the popping operation.

Still another object of the invention resides in the provision of a novel and improved device for popping kernels of corn.

The above and other objects and advantages of the invention will become more apparent from the following description and accompanying drawings forming part of this application.

In the drawings:

FIG. 2 is a cross-sectional view of the structure shown in FIG. 1 taken along the line 2–2 thereof;

Figure 1:
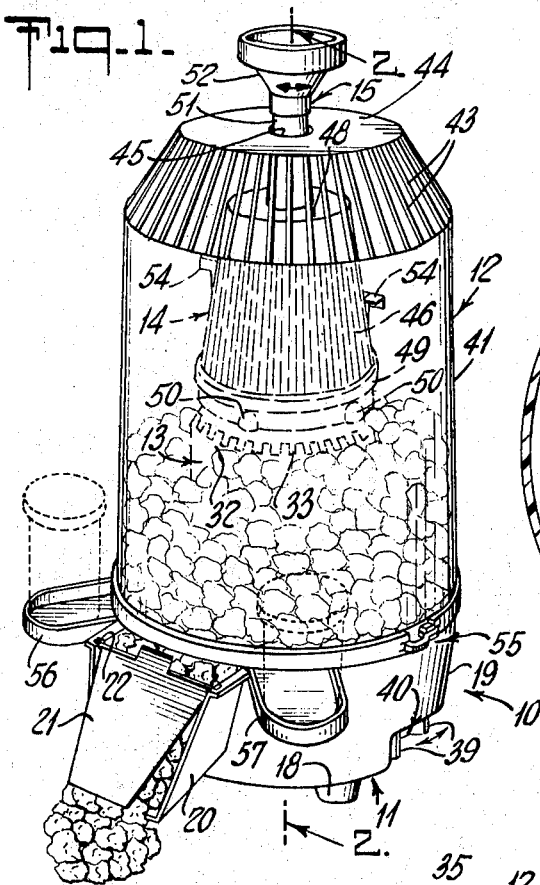
FIG. 1 is a perspective view of one embodiment of a popcorn popper in accordance with the invention.
Figure 3:
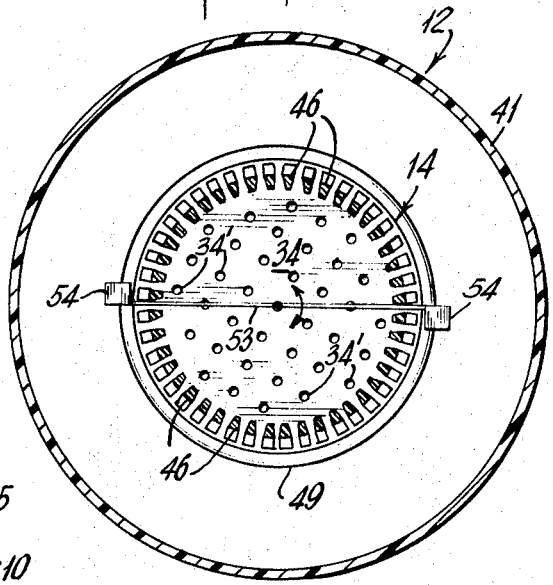
Figure 4:
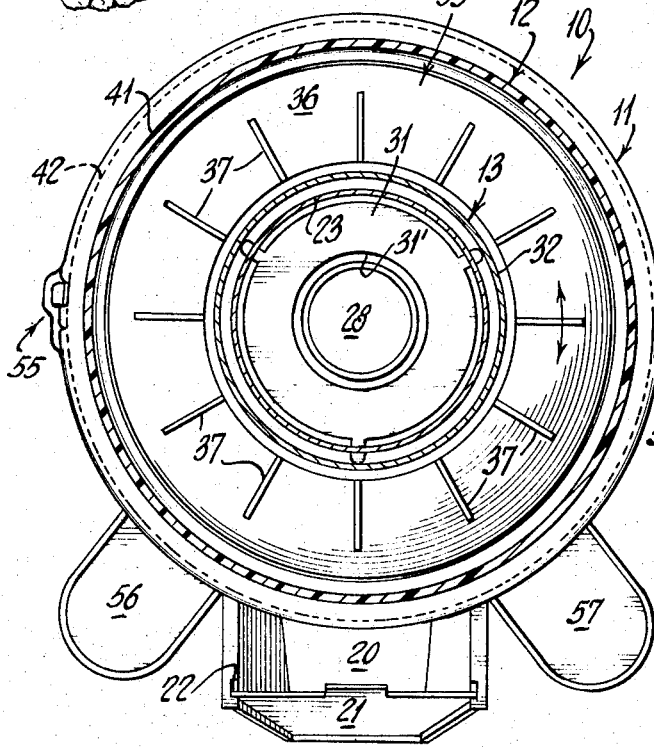
Figure 5:
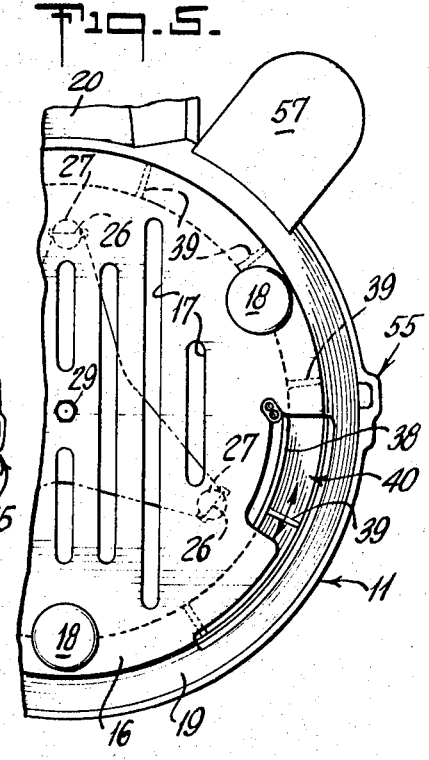

FIGS. 3 and 4 are cross-sectional views of FIG. 2 taken along the lines 3–3 and 4–4 thereof; and FIG. 5 is a fragmentary bottom view of the structure shown in FIG. 1.

Referring now to the drawings, the novel and improved popcorn popper in accordance with the invention is generally denoted by the numeral 10 and comprises a base 11 and an upper outer housing 12. The heating unit, generally denoted by the numeral 13, is carried by the base 11 and extends upwardly within the outer housing 12. A retaining cage 14 is supported on the top of the heating means 13 and includes an upwardly extending tubular member generally denoted by the numeral 15 through which corn to be popped may be inserted and which also functions to raise the cage 14 to discharge the popped corn into the area of the outer housing 12 and base 11 surrounding the heating means 13.

More specifically, the base 11 comprises a bottom wall 16 having a plurality of openings 17 for the flow of air upwardly therethrough. Legs 18 support the base 11 in spaced relationship to a supporting surface. The sidewall 19 of the base slopes upwardly and outwardly from the bottom wall 16, and a chute 20 is formed integrally with and extends outwardly from the sidewall 19. A hinged closure 21 is pivotally secured at 22 to the chute 20 so that it can be opened for the discharge of popped corn.

The heating means 13 includes a vertically disposed cylindrical element 23 secured at the bottom edge thereof to a triangular support 24 by tabs 25 engaging cooperating holes in the support 24. The support 24 has three downwardly extending legs 26 forcibly inserted in tubular elements 27 formed integrally with the bottom 16 and extending upwardly therefrom. An electric socket 28 is secured to the support 24 and to the bottom wall 16 by a screw 29 which extends through the bottom wall 16, the support 24 and into a cooperating threaded opening in the bottom of the socket 28. A suitable electric cable not shown extends from the socket for connecting the socket to a source of energy. The actual heating means comprises a conventional light bulb 30 threadably engaging the socket 28. An annular shield 31 is carried by the cylindrical member 23 at a point slightly above the socket 28 and has a central opening 31' through which the base of the lamp 30 is inserted.

The heating means 13 further includes an annular shield 32 surrounding the tubular member 23 and has a plurality of spaced fingers 33 about the upper edge thereof to permit the flow of air upwardly between the concentric elements 23 and 32. In this way corn which has been popped will not be in direct contact with the cylindrical element 23 surrounding the lamp bulb, but sufficient heat will be transmitted to the popped corn to keep it in a heated state. The top of the cylindrical member 23 surrounding the bulb 30 is provided with a perforated cover 34 with the perforations 34' being smaller than the size of the corn to be popped so that the corn will rest on this surface during the popping process.

The base 11 further includes an annular element generally denoted by the numeral 35 which includes an inclined top wall 36 having a plurality of radially disposed ribs 37 and a downwardly extending annular wall 38. The wall 38 rests on the bottom wall 16 and the outer edge of the inclined wall 36 is in substantial alignment with the bottom wall of the chute 20 as will be observed more clearly in FIG. 2. The annular element 35 further includes a plurality of outwardly extending tabs 39, and an opening 40 in the sidewall 19 of the base exposes certain of the tabs 39 so that the element can be oscillated to facilitate discharge of the popped corn through the chute.

The outer housing or cover 12 has an annular wall 41 preferably of a transparent material, and the bottom edge thereof is formed with a groove 42 to receive and engage the upper edge of the sidewall 19 of the bottom 11. The top of the outer housing 12 has a plurality of spaced inclined ribs 43 which are formed integrally with the sidewall 41 and with the top wall 44 to form a unitary structure. The ribs 43 permit the flow of air freely through the housing. The top wall 44 has a central opening 45 to accommodate the upwardly extending tubular element 15 as will be described.

The cage assembly 14 is formed of a plurality of spaced ribs 46 integrally formed with a bottom ring 47 and a top wall 48 to form a conically shaped cagelike structure. The ring 47 is enclosed by a U-shaped metal ring 49, the latter engaging and resting upon outwardly extending shoulders 50 positioned at spaced intervals about the cover 34 of the heating assembly 13.

The top wall 48 of the assembly 14 includes an upwardly extending tubular member 51 which extends beyond the top 44 of the outer housing 12 and carries a funnel shaped member 52 to facilitate insertion of corn to be popped into the popper. The assembly further includes a metal plate 53 having outwardly extending tabs 54 that pass between the ribs 43 to hold loosely the plate 53 in position. With this arrangement as the corn is popped, it is retained within the cage by the ribs 46 and may be discharged into the area surrounding the heating means 13 by grasping the funnel 52 and lifting the entire cage assembly 14. When the assembly 14 is raised, the metal plate 53 will drop downwardly until the tabs 54 engage the annular metal ring 49. Since the tabs 54 are loosely engaged between the ribs 46, the plate will readily tilt from side to side as the cage is tilted, and this action not only facilitates removal of the popped corn but also permits the plate 53 to be moved across the surface of the perforated plate 34 to remove all popped corn and remaining kernels therefrom.

The outer housing 12 is secured to the base by locking means generally denoted by the numeral 55 as will be viewed more clearly in FIG. 1, and the base 11 may include outwardly extending supports 56 and 57 to hold containers for melted butter and salt as may be desired.

I claim:

1. A popcorn popper comprising a base, an outer housing carried by said base and having an opening in the top wall thereof, heating means carried by said base and extending upwardly therefrom, said heating means including a top surface, a tubular cage having its lower edge removably engaging said heating means and a tubular member secured at its lower end to said cage and communicating therewith, said tubular member extending upwardly through the opening in said top wall whereby corn to be popped may be fed to said heating means through said tubular member and popped corn removed from said cage by raising said tubular member and said cage.

2. A popcorn popper according to claim 1 wherein said base includes a chute extending therefrom and an oscillatory ring within said base, said ring having an inclined top wall aligned with said chute to facilitate discharge of popped corn from said popper.

3. A popcorn popper according to claim 1 wherein said cage includes a lower annular member and a plurality of spaced parallel ribs extending upwardly from said annular member and secured to the top wall of said cage.

4. A popcorn popper according to claim 3 wherein said cage further includes a metal plate having a length slightly less than the inside diameter of said lower annular member and a pair of tabs at the upper edge thereof and extending outwardly between said ribs whereby said plate is movable vertically in said cage and is tiltable when in the lower position wherein said tabs engage said annular member.

5. A popcorn popper according to claim 1 wherein said heating means comprises a first tubular member, a second tubular member surrounding and spaced from the first tubular member, means permitting air flow between said tubular members and a heat source disposed within said first tubular member.

6. A popcorn popper according to claim 5 wherein said heat source comprises an incandescent lamp.

7. A popcorn popper according to claim 5 wherein said base includes a chute extending therefrom and an oscillatory ring within said base, said ring having an inclined top wall aligned with said chute to facilitate discharge of popped corn from said popper.

8. A popcorn popper according to claim 5 wherein said cage is formed of a lower annular member, a plurality of spaced parallel ribs extending upwardly from said annular member and secured to the top wall of said cage.

9. A popcorn popper according to claim 8 wherein said cage further includes a metal plate having a length slightly less than the inside diameter of said lower annular member and a pair of tabs at the upper edge thereof and extending outwardly between said ribs whereby said plate is movable vertically in said cage and is tiltable when in the lower position wherein said tabs engage said annular member.

10. A popcorn popper according to claim 8 wherein said heat source comprises an incandescent lamp.